(12) United States Patent
Shuck et al.

(10) Patent No.: US 10,487,665 B2
(45) Date of Patent: Nov. 26, 2019

(54) ACOUSTIC BREAKTHROUGH DETECTION

(71) Applicant: Rolls-Royce Corporation, Indianapolis, IN (US)

(72) Inventors: Quinlan Yee Shuck, Indianapolis, IN (US); Martin Lee McCormick, Mooresville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 460 days.

(21) Appl. No.: 15/041,636

(22) Filed: Feb. 11, 2016

(65) Prior Publication Data
US 2016/0229019 A1    Aug. 11, 2016

Related U.S. Application Data

(60) Provisional application No. 62/114,893, filed on Feb. 11, 2015.

(51) Int. Cl.
| | |
|---|---|
| *B23K 26/382* | (2014.01) |
| *B23K 26/03* | (2006.01) |
| *B23H 9/14* | (2006.01) |
| *B23H 11/00* | (2006.01) |
| *F01D 5/18* | (2006.01) |

(Continued)

(52) U.S. Cl.
CPC .............. *F01D 5/186* (2013.01); *B23B 49/00* (2013.01); *B23H 9/14* (2013.01); *B23H 11/00* (2013.01); *B23K 26/03* (2013.01); *B23K 26/0884* (2013.01); *B23K 26/389* (2015.10); *B23K 26/702* (2015.10); *B23Q 17/22* (2013.01); *B23B 2215/81* (2013.01); *B23B 2260/128* (2013.01); *B23B 2270/10* (2013.01); *B23B 2270/32* (2013.01); *B23K 2101/001* (2018.08); *B23K 2103/26* (2018.08); *B33Y 10/00* (2014.12); *F05D 2230/12* (2013.01);
(Continued)

(58) Field of Classification Search
CPC .......... B23H 11/00; B23H 9/14; B23K 26/03; B23K 26/389; B23K 26/0884; B23K 26/702; B23K 2201/001; B23K 2203/26; B23Q 15/02; B23Q 17/20; B33Y 10/00; F01D 5/186; B23B 2215/81; B23B 2260/128; B23B 2270/10; B23B 2270/32; B23B 41/16; B23B 49/00; F05D 2230/12; F05D 2230/13; F05D 2270/80; G10K 5/02; Y02T 50/676
USPC ......................................... 219/69.17; 451/28
See application file for complete search history.

(56) References Cited

U.S. PATENT DOCUMENTS

| | | | |
|---|---|---|---|
| 4,504,727 A | | 3/1985 | Melcher et al. |
| 4,507,536 A | * | 3/1985 | Inoue .................... B23K 15/00 |
| | | | 219/121.62 |

(Continued)

*Primary Examiner* — Dana Ross
*Assistant Examiner* — Joe E Mills, Jr.
(74) *Attorney, Agent, or Firm* — Shumaker & Sieffert, P.A.

(57) ABSTRACT

Disclosed techniques include creating a pressure differential within an interior of a dual-wall component relative to pressure at an exterior of the dual-wall component, fabricating a hole in a first wall of the dual-wall component, while fabricating the hole in the first wall of the dual-wall component, acoustically monitoring the hole fabrication, while acoustically monitoring the hole fabrication, detecting breakthrough of the first wall of the dual-wall component based on an acoustic signal due to gas passing through the fabricated hole, and based on the acoustic signal, ceasing the fabrication of the hole.

20 Claims, 5 Drawing Sheets

(51) Int. Cl.
    *B23K 26/08*     (2014.01)
    *B23K 26/70*     (2014.01)
    *B23B 49/00*     (2006.01)
    *B23Q 17/22*     (2006.01)
    *B33Y 10/00*     (2015.01)
    *B23K 101/00*     (2006.01)
    *B23K 103/18*     (2006.01)

(52) U.S. Cl.
    CPC ...... *F05D 2230/13* (2013.01); *F05D 2270/80* (2013.01); *Y02T 50/676* (2013.01)

(56) References Cited

U.S. PATENT DOCUMENTS

| | | | |
|---|---|---|---|
| 6,191,385 B1 * | 2/2001 | O Loughlin | C21D 10/005 219/121.6 |
| 6,329,633 B1 | 12/2001 | Lamm et al. | |
| 6,828,524 B2 | 12/2004 | Hong et al. | |
| 7,784,183 B2 | 8/2010 | Rockstroh et al. | |
| 8,109,712 B2 | 2/2012 | Ahmad et al. | |
| 8,847,114 B1 * | 9/2014 | Shin | B23K 26/02 219/121.71 |
| 2003/0062349 A1 * | 4/2003 | Suh | B23K 26/0069 219/121.83 |
| 2005/0045607 A1 * | 3/2005 | Tenaglia | B23K 26/0069 219/121.85 |
| 2010/0147812 A1 * | 6/2010 | Beck | B23K 26/0622 219/121.71 |
| 2011/0139752 A1 * | 6/2011 | Carter | B23K 26/702 219/121.7 |
| 2011/0168679 A1 * | 7/2011 | Qi | B23K 26/36 219/75 |
| 2011/0309059 A1 * | 12/2011 | Humphreys | B23K 26/0823 219/121.71 |
| 2012/0000893 A1 * | 1/2012 | Broude | B23K 26/032 219/121.69 |
| 2013/0178952 A1 | 7/2013 | Wersborg et al. | |
| 2013/0178953 A1 * | 7/2013 | Wersborg | B23K 1/0056 700/48 |
| 2014/0075755 A1 | 3/2014 | Hu et al. | |
| 2014/0348665 A1 * | 11/2014 | Smith | F01D 5/188 416/97 R |

\* cited by examiner

ACOUSTIC BREAKTHROUGH DETECTION

This application claims the benefit of U.S. Provisional Application No. 62/114,893 filed Feb. 11, 2015, which is incorporated herein by reference in its entirety.

TECHNICAL FIELD

The disclosure relates to manufacturing techniques, and more particularly, but without limitation, to breakthrough detection when fabricating a hole in a component.

BACKGROUND

Components in a gas turbine engine are often cooled to survive the high temperatures found therein. One method used is thin film cooling by a supply of air, used as a cooling fluid, which is provided to a passage within the component, exiting via cooling holes to form a thin film over the external surface of the component. In addition to removing heat from the component by conduction, the thin film of cooling air serves to prevent hot gas within the gas turbine engine from impinging upon the component. In some examples, machining or laser drilling may be used to form holes for thin film cooling.

SUMMARY

This disclosure is directed to techniques for design and manufacturing associated with fabricating holes in a component. In some examples, disclosed techniques include fabricating thin film cooling holes in a dual-wall component such as an airfoil of a gas turbine engine. Disclosed techniques include creating a pressure differential between the interior of the dual-wall component and the exterior of the dual-wall component. During fabrication of the hole in the component, breakthrough may be detected by acoustically monitoring the machining location and detecting an acoustic response, for example, a whistle, when the machining apparatus breaks through to the interior of the dual-wall component.

In one example, this disclosure is directed to a method comprising creating a pressure differential within an interior of a dual-wall component relative to pressure at an exterior of the dual-wall component, fabricating a hole in a first wall of the dual-wall component, while fabricating the hole in the first wall of the dual-wall component, acoustically monitoring the hole fabrication, while acoustically monitoring the hole fabrication, detecting breakthrough of the first wall of the dual-wall component based on an acoustic signal due to gas passing through the fabricated hole, and based on the acoustic signal, ceasing the fabrication of the hole.

In another example, this disclosure is directed to a system comprising a hole fabricator, an acoustic monitor, and a controller. The controller is configured to send control signals to the hole fabricator instructing the hole fabricator to fabricate a hole in a first wall of the dual-wall component, while fabricating the hole in the first wall of the dual-wall component, acoustically monitor the hole fabrication with the acoustic monitor, while acoustically monitoring the hole fabrication, detect breakthrough of the first wall of the dual-wall component based on an acoustic signal from the acoustic monitor, the acoustic signal representing gas passing through the fabricated hole, and based on the acoustic signal, send further control signals to the hole fabricator instructing the hole fabricator to cease the fabrication of the hole.

In a further example, this disclosure is directed to a non-transitory computer-readable data storage medium having instructions stored thereon that, when executed by one or more processors of a computing device, cause the computing device to send control signals to a hole fabricator instructing the hole fabricator to fabricate a hole in a first wall of the dual-wall component, while fabricating the hole in the first wall of the dual-wall component, acoustically monitor the hole fabrication with an acoustic monitor, while acoustically monitoring the hole fabrication, detect breakthrough of the first wall of the dual-wall component based on an acoustic signal from the acoustic monitor, the acoustic signal representing gas passing through the fabricated hole, and based on the acoustic signal, send further control signals to the hole fabricator instructing the hole fabricator to cease the fabrication of the hole.

The details of one or more examples of this disclosure are set forth in the accompanying drawings and the description below. Other features, objects, and advantages of this disclosure will be apparent from the description and drawings, and from the claims.

DETAILED DESCRIPTION

Gas turbine engines are widely used in aircraft propulsion, electric power generation, ship propulsion, and pumps. In gas turbine engine applications, efficiency is a prime objective. In general, improved gas turbine engine efficiency may be obtained by operating at higher temperatures. Indeed, operating temperatures in a turbine section of a gas turbine engine may exceed melting points of superalloy materials used in turbine components. To prevent melting of the engine components, a gas turbine engine airfoil generally incorporates air-cooling discharging through thin film cooling holes. Cooling may be provided by flowing relatively cool air from the compressor section of the engine through passages in the turbine components to be cooled. These passages exhaust some or all of the cooling air through orifices or cooling holes on the surfaces of the airfoil. Further, increasing the amount of cooling benefit obtained from a given amount of cooling air increases the efficiency of the gas turbine engine by limiting the energy consumed by the delivery of the cooling air. Thin film cooling holes may be of a small size and precisely located.

The disclosure describes techniques for utilizing acoustic detection to detect breakthrough during formation of a hole, such as a thin film cooling hole. In some examples, thin film cooling holes may be formed in an outer sheet or wall of a dual-wall component, which may render the backside of the outer sheet difficult to access. Acoustic detection may allow detection of breakthrough without requiring visual or physical access to the backside of the outer sheet. Breakthrough detection also may allow stopping of the hole formation process when breakthrough is made, which may limit or eliminate damage to the inner wall due to the hole formation technique.

In some examples, a pressure differential is created between the interior of the dual-wall component and the exterior of the dual-wall component. As such, at breakthrough, the pressure differential may cause flow of fluid (e.g., air) from the higher pressure interior to the lower pressure exterior. An acoustic sensor may detect an acoustic signal caused by the flow of fluid from the higher pressure interior to the lower pressure exterior. A controller may stop the hole formation process, modify one or more parameters of the hole formation process, or the like, based on the detected acoustic signal. For example, for a predetermined pressure differential, a higher pitch may indicate a smaller diameter hole. Thus, the controller may use the pitch of the acoustic signal to determine the diameter of the hole, and may control the hole formation process based on the hole diameter.

Figure 1:
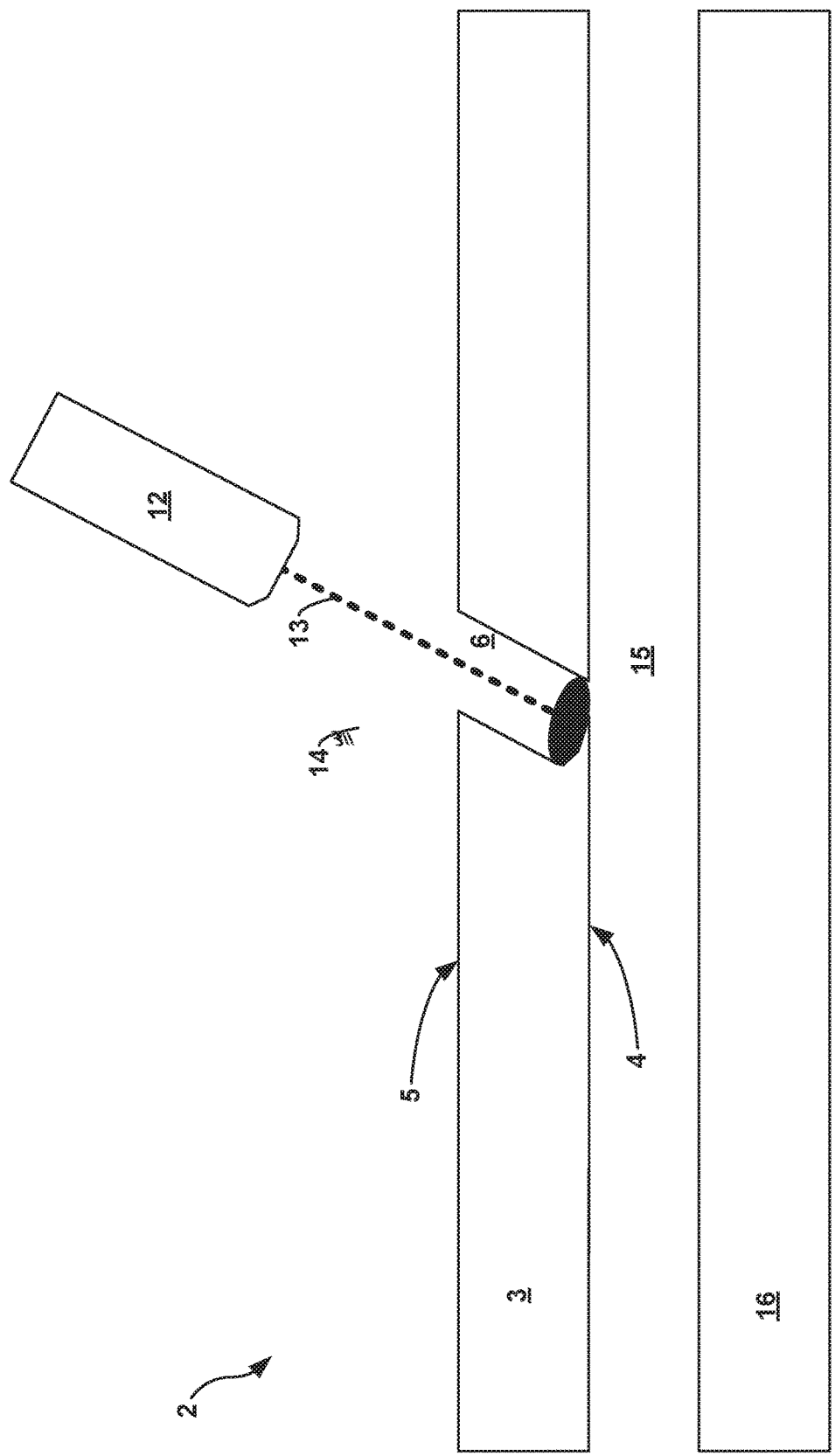
FIG. 1 is a conceptual illustration of laser drilling a hole through the outer wall of a dual-wall component.

FIG. 1 is a conceptual illustration of laser drilling hole 6 through outer wall covering 3 of dual-wall component 2, which also includes and structural member 16. Dual-wall component 2 may represent a blade airfoil configured for use in a gas turbine engine, or other component in which thin film cooling is desirable. Gap 15 separates outer wall covering 3 and structural member 16. In some examples, gap 15 may be no greater than about 0.10 inches. In some examples, dual-wall component 2 may be formed from a nickel super alloy. For example, dual-wall component 2 may be formed using an investment metal casting process in which outer wall covering 3 and structural member 16 are formed as part of a unitary metal casting. In one particular example, the geometry of gap 15 may be formed using a ceramic core that is later dissolved or otherwise removed following the metal casting process used to form outer wall covering 3 and structural member 16. In other examples, dual-wall component 2 may be formed with additive manufacturing techniques or sheet metal stamping. In case, the design of dual-wall component 2 may limit physical access for tooling to gap 15. Due to the limited physical access for tooling to gap 15 is may be difficult or impossible to directly shield structural member 16 from a fabrication process used to form holes within outer wall covering 3.

As illustrated by FIG. 1, laser drill 12 is in the process of fabricating thin film cooling hole 6 in outer wall covering 3 with laser beam 13. Once fabricated, thin film cooling hole 6 forms a passage between external surface 5 of outer wall covering 3 and internal surface 4 of outer wall covering 3. As shown, thin film cooling hole 6 is at a non-perpendicular angle to external surface 5 and internal surface 4 of outer wall covering 3. In some examples, thin film cooling hole 6 may be at angle between about 90 degrees (perpendicular) and about 10 degrees to external surface 5 and/or internal surface 4 of outer wall covering 3. In some particular examples, thin film cooling hole 6 may be at angle of less than 75 degrees, such as an angle of about 10 degrees, of about 15 degrees or of about 30 degrees to external surface 5 of outer wall covering 3. In other examples, thin film cooling hole 6 may be substantially perpendicular to external surface 5 of outer wall covering 3.

While only a single thin film cooling hole 6 is shown in outer wall covering 3, outer wall covering 3 may include an array of substantially similar thin film cooling holes formed by laser drill 12 or otherwise. Different thin film cooling holes in the array may be of various diameters and angles to external surface 5 of outer wall covering 3, or each of the thin film cooling holes in the array may be of substantially similar diameter and/or angle relative to external surface 5 of outer wall covering 3.

In accordance with the techniques of this disclosure, during the formation of thin film cooling hole 6, and the formation of other thin film cooling holes in dual-wall component 2, a pressure differential is created between the interior of dual-wall component 2 as represented by gap 15 and the exterior of dual-wall component 2, for example, at external surface 5 of outer wall covering 3. During the laser drilling of thin film cooling hole 6, once laser beam 13 breaches internal surface 4 of outer wall covering 3, gasses will pass through thin film cooling hole 6 due to the pressure differential, thereby creating acoustic signal 14. In some examples, acoustic signal 14 may be a whistle with audible and/or ultrasonic frequencies. Once fabricated, thin film cooling hole 6 forms a passage between external surface 5 of outer wall covering 3 and internal surface 4 of outer wall covering 3.

In other examples, fabricating holes, such as thin film cooling hole 6 may include mechanical drilling, laser drilling, electrical discharge machining and/or electro-discharge machining (EDM). For example, a thin film cooling hole 6, such as thin film cooling hole 6, may be fabricating with a drilling operation or with a consistent angle helical cutting action of a milling bit. While thin film cooling hole 6 is shown with simple geometry, in other examples, a thin film cooling hole may include more complex geometry, e.g., to improve or control flow through the thin film cooling hole. In each of these examples, an acoustic signal from flow through thin film cooling hole 6 caused by a pressure differential may be used to detect breakthrough during fabrication of the hole.

As discussed in further detail below, the acoustic signal may be used to determine when to cease the fabrication of the hole, and/or to adjust the fabrication parameters. In the example of laser drill 12, the rate of incursion of laser drill 12 may be reduced based on acoustic signal 14. Reducing the rate of incursion of laser drill 12 towards the end of the fabrication of thin film cooling hole 6, e.g., immediately after breakthrough detection, may provide an improved surface finish for thin film cooling hole 6 and/or limit any damage or other impact laser drill 12 may have on structural member 16. In addition, detecting breakthrough may also allow for a higher rate of incursion of laser drill 12 prior to breakthrough while limiting the risk of unwanted drilling to structural member 16, thereby speeding up the fabrication of thin film cooling hole 6 as compared to using a lower rate of incursion throughout the formation of thin film cooling hole 6. Advantages of detecting breakthrough during fabrication of a hole may include, for example, improved surface finish, faster hole fabrication cycle times and reduced risk of unwanted drilling to structural member 16 also apply to alternative hole fabrication techniques including mechanical drilling and EDM.

Figure 2:
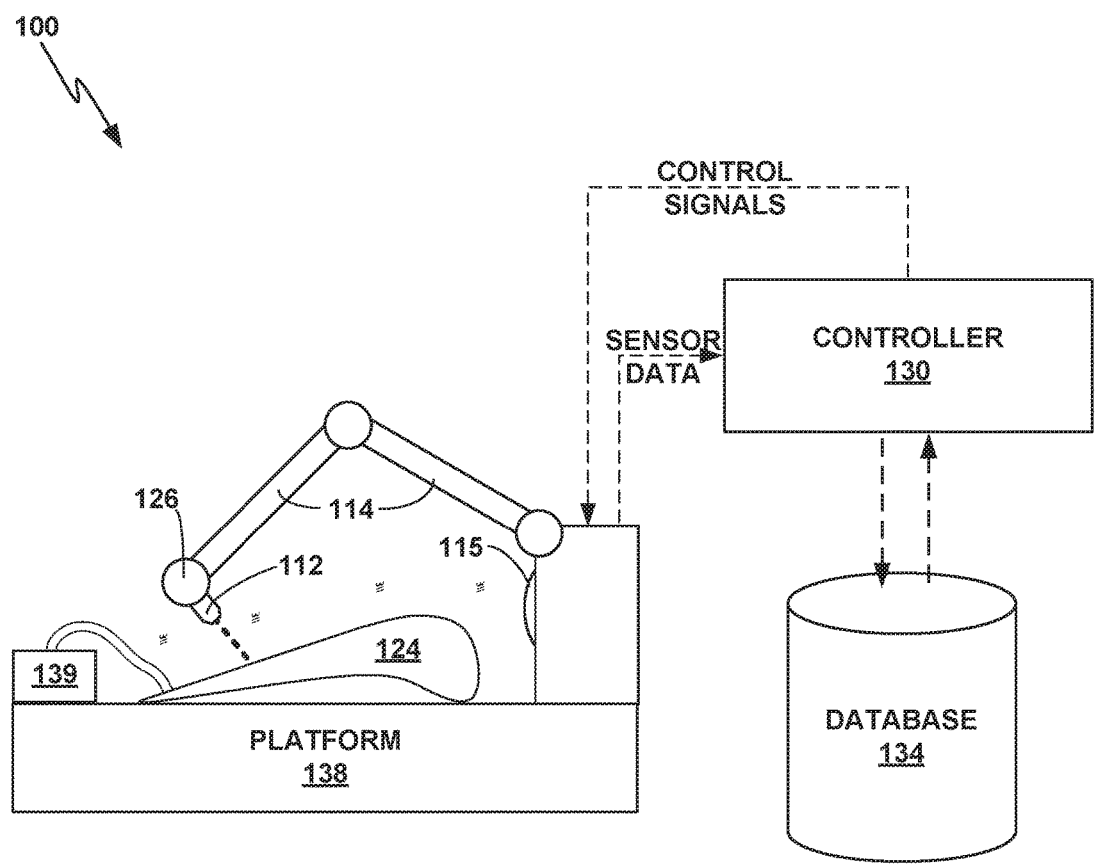
FIG. 2 illustrates a system including a platform, a five-axis mechanical holding arm configured to manipulate a laser drill, a compressed gas source, an acoustic sensor and a computing device configured to laser drill a component secured to the platform based on acoustic signals monitored by the acoustic sensor.

FIG. 2 illustrates system 100. System 100 includes laser drill 112 mounted to five-axis mechanical holding arm 114, platform 138, acoustic sensor 115, controller 130 and database 134. In addition, component 124 is mounted to platform 138. Platform 138 serves as a platform for five-axis mechanical holding arm 114 as well as component 124. As shown in FIG. 2, component 124 is mounted to platform 138 to facilitate precise positioning of holes drilled with laser drill 112. In some examples, component 124 may remain secured to platform 138 for measurements and other fabrication operations.

Laser drill 112 is secured within distal end 126 of mechanical holding arm 114. Five-axis mechanical holding arm 114 allows computer controlled positioning and rotation of laser drill 112 to facilitate fabrication of holes within component 124. While system 100 includes laser drill 112, the other hole fabricators may be used within the spirit of this disclosure such as mechanical drills and EDM. In addition, system 100 includes five-axis mechanical holding arm 114, other positioning techniques for laser drill 112 may be used within the spirit of this disclosure, such as such as two or three axis positioning systems. In the same or different examples, the position of component 124 may be manipulated during the fabrication of an array of thin film cooling holes.

System 100 further includes compressed gas source 139 connected to component 124 to create a pressure differential within the interior of component 124 relative to the exterior of component 124. For example, in the example in which component 124 is a blade, such as blade 200 (FIGS. 3A-3C), gas source 139 may be connected to an air supply inlet for thin film cooling. Upon breakthrough, the pressure differential provided by gas source 139 creates an acoustic signal from flow through a thin film cooling hole and may be used to detect breakthrough during fabrication of the hole with acoustic sensor 115. In some examples, the acoustic signal may be a whistle with audible and/or ultrasonic frequencies. While compressed gas source 139 provides a positive pressure within the interior of component 124, the techniques of this disclosure could also be implemented with a negative pressure within the interior of component 124.

In some examples, gas source 130 may be configured to provide a gas that is selected to change a frequency of an acoustic emission generated by gas passing through the fabricated hole compared to a frequency of an acoustic emission generated by gas passing through the fabricated hole with a similar flow rate. For example, gas source 130 may be configured to provide a gas that is selected to raise or lower the frequency of the acoustic emission generated by gas passing through the fabricated hole compared to the frequency of an acoustic emission generated by gas passing through the fabricated hole with a similar flow rate. A gas that is more dense than air may lower a frequency of the acoustic emission and a gas that is less dense that air may raise a frequency of the acoustic emission.

In some examples, gas source 130 may be configured to provide a gas that is selected to aid the hole forming process by at least one of protecting component 124, improving a surface finish of a cooling hole 6 (FIG. 1), or improving a surface geometry of a cooling hole 6 (FIG. 1) at the an interior surface of outer wall covering 3. For example, inert or substantially inert gases such as argon, helium, or nitrogen may reduce oxidation of the surface of cooling hole 6 compared to oxidation that may occur when using air. Reducing oxidation may protect component 124, improving a surface finish of cooling hole 6, and improving surface geometry of cooling hole 6 at the an interior surface of outer wall covering 3. As another example, a gas that absorbs radiation of a frequency substantially matching a dominant frequency the laser beam generated by laser drill 112 may protect component 124 by reducing a likelihood that the laser beam may damage an inner structure (e.g., inner wall) of a dual walled component 124.

Acoustic sensor 115 may be a microphone, such as a directional microphone. While acoustic sensor 115 is depicted as being located on platform 138, acoustic sensor 115 may be positioned in other places, such as on mechanical holding arm 114, and/or laser drill 112. In the same or different examples, multiple acoustic sensors may be used to monitor an audible signal and detect breakthrough. For example, multiple signal inputs, such as microphones placed in different locations and timing signals from the drilling laser, may be used to filter background noise generated from the drilling process. The resulting signal may be used to resolve the breakthrough of the hole, hole size and completeness.

In addition to component 124, acoustic sensor 115 is configured to monitor platform 138 to facilitate breakthrough detection based on the acoustic signal. The acoustic signal may be used to determine when to cease the fabrication of a hole, and/or to adjust the fabrication parameters. In the example of laser drill 112, the rate of incursion of laser drill 112 may be reduced based on the acoustic signal. Reducing the rate of incursion of laser drill 112 towards the end of the fabrication of a thin film cooling hole may provide an improved surface finish for a thin film cooling hole and/or limit any damage or other impact laser drill 112 may have on component 124. In addition, detecting breakthrough may also allow for a higher rate of incursion of laser drill 112 prior to breakthrough while limiting the risk of unwanted drilling component 124, thereby speeding up the fabrication of thin film cooling holes as compared to using a lower rate of incursion throughout the formation of thin film cooling holes. Advantages of detecting breakthrough during fabrication of a hole may include, for example, improved surface finish, faster hole fabrication cycle times and reduced risk of unwanted drilling to component 124 also apply to alternative hole fabrication techniques including mechanical drilling and EDM rather than laser drilling with laser drill 112.

Controller 130 represents a computing device configured to operate five-axis mechanical holding arm 114 to fabricate holes in component 124 with laser drill 112. In some particular examples, controller 130 may include multiple computing devices that combine to provide the functionality of controller 130 as described herein. For example, controller 130 may comprise a CNC controller that issues instructions to distal end 126 and positioning actuators of distal end 126 as well as a separate computing device that interacts with database 134 to store and retrieve control programs, calibration and/or component design data. In some examples, such a computing device may represent a general purpose computer running software. Controller 130 may be connected to database 134, which includes a non-transitory computer-readable medium storing control programs, calibration and/or measurement data.

Figure 3A:
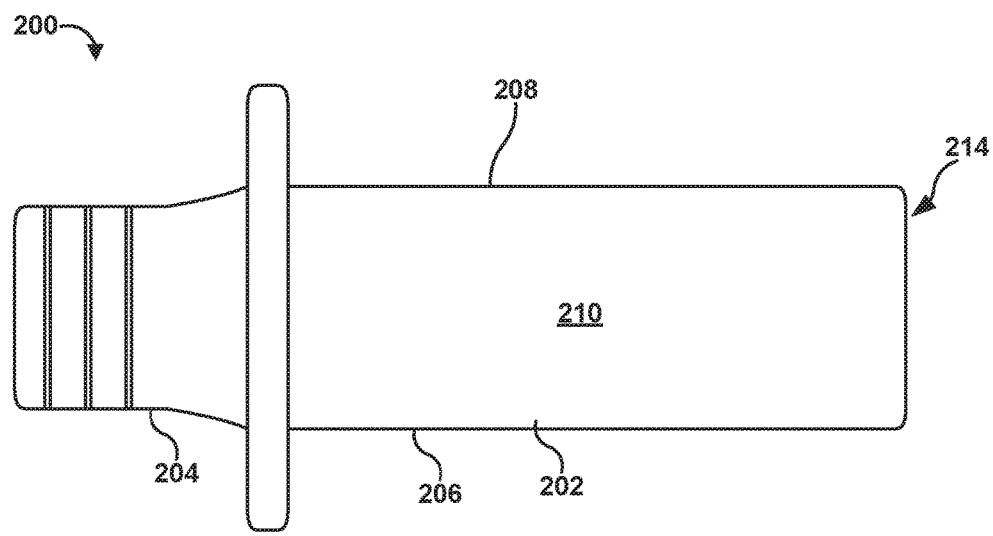
FIGS. 3A-3C are conceptual diagrams of an example blade airfoil configured for use in a gas turbine engine, the airfoil including thin film cooling holes fabricated as disclosed herein.
Figure 3B:
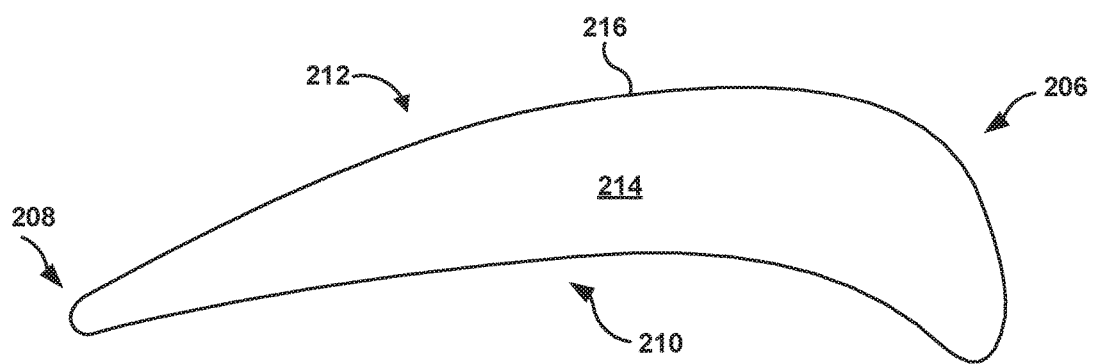
Figure 3C:
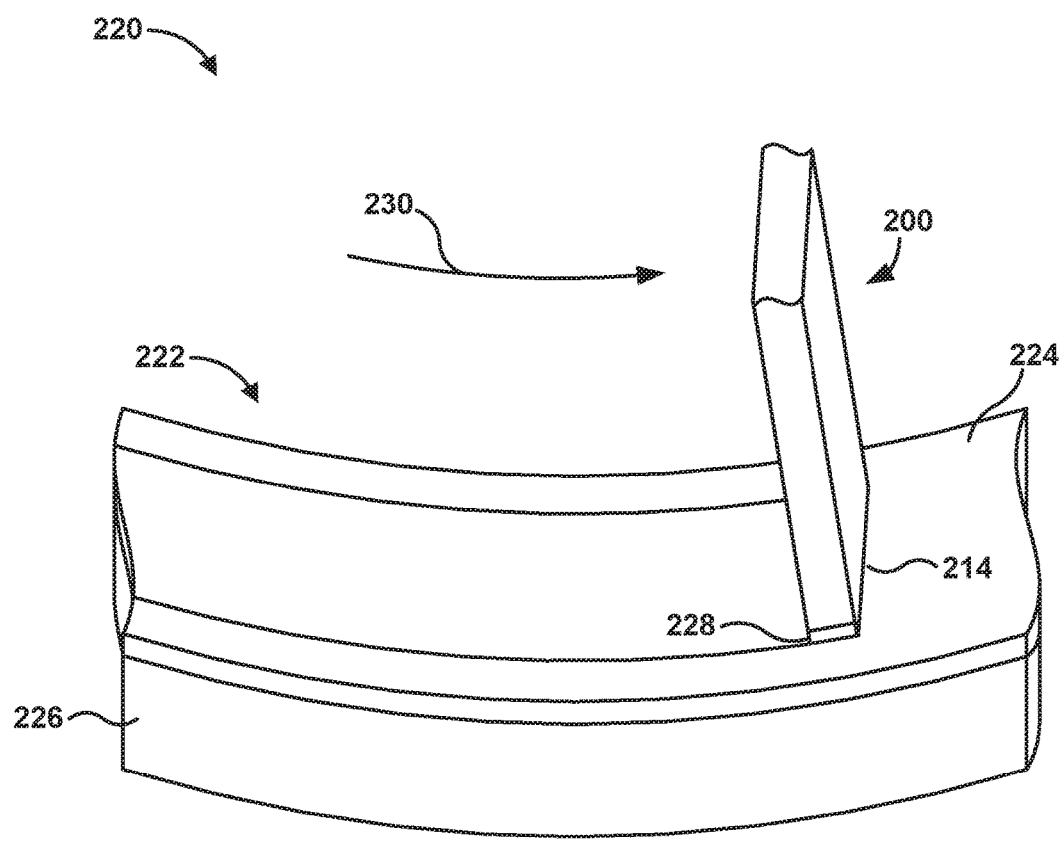

FIGS. 3A-3C illustrate different views of an example blade 200 which may include features and arrays of features, such as thin film cooling holes, according to an example of the disclosure. Blade 200 generally includes airfoil 202 attached to stalk 204. Airfoil 202 includes a leading edge 206, a trailing edge 208, a pressure sidewall 210, and a suction sidewall 212. Pressure sidewall 210 is connected to suction sidewall 212 at leading edge 206 and trailing edge 208. Further, blade 200 defines blade tip 214, which is a surface substantially orthogonal to leading edge 206. Blade tip 214 is defined by an edge 216 that extends about the perimeter of the surface of blade tip 214, and separates the surface of blade tip 214 from the adjacent surface of airfoil 202. Leading edge 206, trailing edge 208, pressure sidewall 210, and suction side wall 212 generally extend from stalk 204 to edge 216.

In general, blade 200 is a component of a mechanical system including, e.g., a gas turbine engine. In different examples, blade 200 may be a compressor blade that imparts kinetic energy into a fluid or a turbine blade that extracts kinetic energy from a moving fluid. FIG. 3C is a conceptual diagram of an example gas turbine engine 220 including blade track or blade shroud 222 and blade 200. Blade track or blade shroud 222 includes a substrate 226 and an abradable coating 224. Blade 200 is shown with a tip coating 228 deposited on blade tip 214. Tip coating 228 may combine with thin film cooling to protect blade 200 from extreme temperatures during operation of its mechanical system. Although a single blade 200 is shown in gas turbine engine 220 for ease of description, in actual operation, gas turbine engine 220 may include a plurality of blades.

During operation of gas turbine engine 220, blade 200 rotates relative to blade track 222 in a direction indicated by arrow 230. In general, the power and efficiency of gas turbine engine 220 can be increased by reducing the gap between blade track 222 and a tip of blade 200, e.g., to reduce or eliminate gas leakage around blade 200. Thus, gas turbine engine 220, in various examples, is configured to allow blade 200 to abrade into the surface of abradable coating 224, thereby defining a recessed channel along which the tip of blade 200 travels, and which creates a seal between blade track 222 and blade 200. The abrading action may create high thermal and shear stress forces at blade tip 214. In addition, occasional movement of blade tip 214 relative to turbine substrate 226 during the operation of gas turbine engine 222 may cause blade tip 214 to impinge on turbine substrate 226, creating high shear forces at blade tip 214.

To protect against the various forces acting on blade 200 and, in particular, blade tip 214, one or more protective layers may be provided on blade 200 and/or blade tip 214. For example, a tip coating 228, may be provided on blade tip 214 to improve different properties of an underlying blade surface including, e.g., wear, corrosion, hardness, and/or temperature resistance properties of an underlying blade surface. Additionally or alternatively, a protective coating may be applied to an entire airfoil 202, including blade tip 214, to improve different properties of an underlying blade surface. In some examples, airfoil 202 may receive a coating that reduces or substantially eliminates the effects of temperature, oxidation or corrosion on airfoil 202. Regardless of the specific number or specific type of coatings applied to blade 200, in some examples, blade 200 may benefit from the features and arrays of features, such as an array of thin film cooling holes, described in the disclosure.

An airfoil, such as blade 200, may include additional machined features, which may be machined in conjunction with the fabrication of thin film cooling holes to reduce the cycle time required to for the blade airfoil. For example, machining to produce a blade airfoil, such as blade 200, may include gating removal and/or throat machining at the leading edge of the blade airfoil. As another example, machining to produce a blade airfoil may include hole drilling along the trailing edge of the blade airfoil. As further examples, machining to produce a blade airfoil may also include slash face along fore and aft faces and/or tip cap finishing. Each of these machining processes may be implemented in combination with fabrication of thin film cooling holes to limit the cycle time required to machine a blade airfoil, e.g., by only needing to determine the position of the blade airfoil (serving as component 124) once on platform 138 (FIG. 2) and machining each of these features while the blade airfoil is held in the same position. In addition, more than one feature may potentially be machined simultaneously on blade airfoil to further reduce cycle time.

Figure 4:
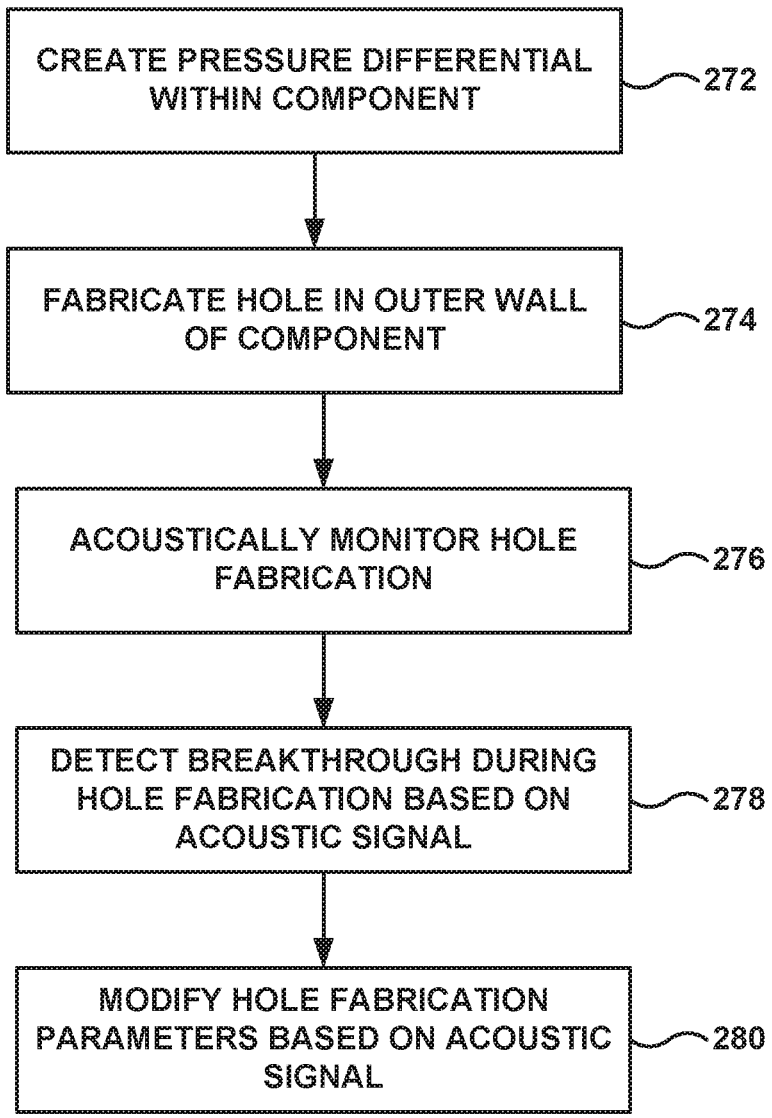
FIG. 4 is a flowchart illustrating example techniques for fabricating holes in a dual-wall component.

FIG. 4 is a flowchart illustrating example techniques for machining an array of thin film cooling holes in a dual-wall component, such as component 2, component 124, and/or blade 200. For clarity, the techniques of FIG. 4 are described with respect to system 100 of FIG. 2.

First, gas source 139 is connected to dual-wall component 124 to create a pressure differential within an interior of dual-wall component 124 relative to pressure at the exterior of dual-wall component 124 (272). Gas source 139 may create a positive or a negative pressure within the interior of dual-wall component 124. Gas source 139 may be controlled by controller 130 or manually operated.

Next, controller 130 issues instructions to five-axis mechanical holding arm 114 and laser drill 112 to fabricating a hole in an outer wall of dual-wall component 124 (274). While fabricating the hole in dual-wall component 124, controller 130 acoustically monitors the hole fabrication based on sensor data received from acoustic sensor 115 (276). While acoustically monitoring the hole fabrication, controller 130 detects breakthrough of the outer wall of dual-wall component 124 based on an acoustic signal due to gas passing through the fabricated hole (278). Based on the acoustic signal, controller 130 issues instructions to modify the fabrication of the hole, such as cease fabrication of the hole (280). In some examples, after detecting breakthrough of the first wall of the dual-wall component based on the acoustic signal and prior ceasing the fabrication of the hole, controller 130 may modify the parameters of the laser drilling with laser drill 112 to reduce a rate of incursion of the laser drill.

Various examples of this disclosure have been described. These and other examples are within the scope of the following claims.

What is claimed is:

1. A system comprising:
a hole fabricator;
an acoustic monitor; and
a computer numerical control (CNC) controller, wherein the CNC controller is configured to:
send control signals to the hole fabricator instructing the hole fabricator to fabricate a hole in a first wall of a dual-wall component;
while fabricating the hole in the first wall of the dual-wall component, acoustically monitor the hole fabrication with the acoustic monitor;
while acoustically monitoring the hole fabrication, detect breakthrough of the first wall of the dual-wall component based on an acoustic signal from the acoustic monitor, the acoustic signal representing gas passing through the fabricated hole; and
based on the acoustic signal, send further control signals to the hole fabricator instructing the hole fabricator to cease the fabrication of the hole.

2. The system of claim 1, further comprising a compressed gas source, the compressed gas source being configured to create a pressure differential within an interior of the dual-wall component relative to at an exterior of the dual-wall component.

3. The system of claim 2, wherein a gas provided by the compressed gas source is selected to raise or lower a frequency of an acoustic emission generated by gas passing through the fabricated hole compared to a frequency of an acoustic emission generated by gas passing through the fabricated hole with a similar flow rate.

4. The system of claim 2, wherein the compressed gas source is a source of an inert gas comprising at least one of argon, helium, or nitrogen.

5. The system of claim 1, wherein the CNC controller is further configured to, after detecting breakthrough of the first wall of the dual-wall component based on the acoustic signal and prior ceasing the fabrication of the hole, send further control signals to the hole fabricator instructing the hole fabricator to reduce a rate of incursion of the fabrication.

6. The system of claim 1, wherein the hole fabricator includes one or more of:
   a laser drill;
   a mechanical drill; or
   an electro-discharge machine.

7. The system of claim 1, further comprising the dual-wall component, wherein the dual-wall component is a blade airfoil comprising:
   a structural member; and
   an outer wall covering the structural member with a gap between the outer wall and the structural member;
   wherein the hole is one of an array of thin film cooling holes in the outer wall, each of the array of holes extending from an exterior surface of the outer wall to an interior surface of the outer wall.

8. A non-transitory computer-readable data storage medium having instructions stored thereon that, when executed by one or more processors of a computing device, cause the computing device to:
   send control signals to a hole fabricator instructing the hole fabricator to fabricate a hole in a first wall of the dual-wall component;
   while fabricating the hole in the first wall of the dual-wall component, acoustically monitor the hole fabrication with an acoustic monitor;
   while acoustically monitoring the hole fabrication, detect breakthrough of the first wall of the dual-wall component based on an acoustic signal from the acoustic monitor, the acoustic signal representing gas passing through the fabricated hole; and
   based on the acoustic signal, send further control signals to the hole fabricator instructing the hole fabricator to cease the fabrication of the hole.

9. The computer-readable data storage medium of claim 8, wherein the instructions stored on the computer-readable data storage medium, when executed by one or more processors of a computing device, further cause the computing device to after detecting breakthrough of the first wall of the dual-wall component based on the acoustic signal and prior ceasing the fabrication of the hole, send further control signals to the hole fabricator instructing the hole fabricator to reduce a rate of incursion of the fabrication.

10. The computer-readable data storage medium of claim 8, wherein the instructions stored on the computer-readable data storage medium, when executed by one or more processors of a computing device, further cause the computing device to send control signals to a compressed gas source instructing the compressed gas source to create a pressure differential within an interior of the dual-wall component relative to at an exterior of the dual-wall component.

11. A method of using the system of claim 1, the method comprising:
   creating a pressure differential within an interior of a dual-wall component relative to pressure at an exterior of the dual-wall component;
   instructing, by a computer numerical control (CNC) controller, a hole fabricator to fabricate a hole in a first wall of the dual-wall component;
   while fabricating the hole in the first wall of the dual-wall component, acoustically monitoring by the CNC controller, using an acoustic monitor, the hole fabrication
   while acoustically monitoring the hole fabrication, detecting, by the CNC controller, breakthrough of the first wall of the dual-wall component based on an acoustic signal due to gas passing through the fabricated hole; and
   based on the acoustic signal, causing, by the CNC controller, the hole fabricator to cease the fabrication of the hole.

12. The method of claim 11, wherein creating the pressure differential comprises creating a positive pressure within the interior of the of the dual-wall component.

13. The method of claim 11, wherein instructing the hole fabricator to fabricate the hole comprises instructing a laser to laser drill the hole.

14. The method of claim 13, further comprising, after detecting breakthrough of the first wall of the dual-wall component based on the acoustic signal and prior ceasing the fabrication of the hole, modifying, by the CNC controller, the parameters of the laser drilling to reduce a rate of incursion of the laser drill.

15. The method of claim 11, wherein instructing the hole fabricator to fabricate the hole comprises one or more of: instructing a mechanical drill to mechanically drill the hole with a machine drill bit; and instructing an electro-discharge machining device to electro-discharge machine the hole.

16. The method of claim 11, wherein the dual-wall component comprises;
   a structural member; and
   an outer wall covering the structural member with a gap between the outer wall and the structural member;
   wherein the outer wall includes the holes extending from an exterior surface of the outer wall to the interior of the dual-wall component.

17. The method of claim 16, wherein the gap between the outer wall and the structural member is no greater than about 0.10 inches.

18. The method of claim 16, further comprising fabricating the structural member and the outer wall covering according to one of a group consisting of:
   as part of a unitary metal casting;
   with additive manufacturing; and
   with sheet metal stamping.

19. The method of claim 11, wherein the design of the dual-wall component limits physical access for tooling to the interior of the dual-wall component.

20. The method of claim 11, wherein the dual-wall component is a blade airfoil comprising:
   a structural member; and
   an outer wall covering the structural member with a gap between the outer wall and the structural member;
   wherein the hole is one of an array of thin film cooling holes in the outer wall, each of the array of holes extending from an exterior surface of the outer wall to an interior surface of the outer wall.

* * * * *